Oct. 21, 1969 D. A. HENDLEY 3,474,340

RADIO TRANSMITTER MEANS UTILIZING SQUARING, AMPLIFICATION LIMITING AND AGC

Filed Dec. 22, 1966 3 Sheets-Sheet 2

United States Patent Office 3,474,340

Patented Oct. 21, 1969

3,474,340

RADIO TRANSMITTER MEANS UTILIZING SQUARING AMPLIFICATION LIMITING AND AGC

Dennis Alfred Hendley, London, England, assignor to Decca Limited, London, England, a British company Filed Dec. 22, 1966, Ser. No. 603,963
Claims priority, application Great Britain, May 23, 1966, 22,960/66
Int. Cl. H04b *1/04, 1/66*
U.S. Cl. 325—187 11 Claims

ABSTRACT OF THE DISCLOSURE

The invention provides a radio transmitter in which automatic gain control functions properly even with faulty output amplifying stages. The transmitter has several intermediate and final amplifying stages respectively coupled in parallel. The input sinusoid is passed through a squaring and limiting circuit, and automatic gain control signals from the parallel intermediate stages and the parallel final stages are combined, rectified and used in a clamping circuit to depress the maximum amplitude of the squared sinusoid to a datum value depressed by the amplitude of the larger of the intermediate and final amplifiers' outputs.

This invention relates to radio transmitting stations. It more particularly relates to radio transmitting stations of the kind suitable for use in a phase comparison radio navigation system in which radio frequency signals may be radiated from a pluraity of stations in order that the position of a receiver of the signals may be determined by comparing the phase of signals received from two or more stations. Such transmitting stations present great problems in design because they normally have to operate continuously for very long periods. It is essential that the transmitting stations should be able to maintain their output power to within fairly close limits continuously, to make the reception of radiated signals at long distances from the stations reliable; they should continue to operate even if a number of components fail. It is usual to provide such stations with a certain degree of redundancy, in, for example, the power amplifying stages, in order that the transmissions may be maintained despite component failure. This is by no means a complete answer to the problem and, of course, does lead to a substantial increase in the amount of equipment provided at a transmitting station.

The maintenance of an output power level constant requires the use of automatic gain control (AGC): the control of the gain of an earlier amplifying stage by means of a signal derived from an output of a later stage. The adoption of conventional automatic gain control, however, may be disadvantageous under certain fault conditions. A simple example may be considered at the present time: if an output stage, providing a normal AGC signal, were to become short circuited or were in some way to provide zero output, the automatic gain control circuit may increase the gain of the "controlled" stage so much that an overdrive condition is produced, in which condition the risk of excessive power consumption and component failure is greatly increased. Comtion ponent failure in the early amplifying stages is serious because it nullifies the benefits of using "redundant" output stages which continue to function even if other output stages are faulty.

The present invention is directed to reduce this and similar problems, and its main object is to provide improved automatic gain control in a radio transmitter.

According to the present invention, in a radio transmitter there are provided means for squaring and amplitude limiting an input radio frequency sinusoidal signal to produce a squared signal having a limited maximum amplitude, an intermediate amplifying stage and an output amplifying stage for successively amplifying said squared signal, or at least the fundamental component thereof, and automatic gain control means, arranged to receive separate control signals respectively representing the amplitude of the outputs of said amplifying stages and arranged to reduce said maximum amplitude of the squared signal in accordance with the amplitude of the larger of said outputs.

With the present invention the input sinusoidal signal, which for radio navigation purposes would normally be in the low frequency band, typically between 70 and 130 kc./s., is converted into a squared signal whose maximum amplitude may thereby be made substantially independent of any load condition at the output of the transmitter. This might possibly be done by causing the input signal to switch a suitably biased trigger or switch circuit "on" and "off," but, preferably, the means of amplitude limiting includes a reversed biassed avalanche or Zener diode or the like coupled across the output of the squaring means.

The control signals from the intermediate stage and the output stage will normally be different; preferably, under normal conditions, the output stage is arranged to provide only a slight voltage amplification compared to the power amplification of the stage, each control signal being representative of the voltage output from the respective stage. In a more particular example, the voltage output of the output stage may be between (approximately) 5 and 10 percent greater than the voltage output from the intermediate stage. Under such circumstances, the output stage will normally provide the degree of current amplification necessary to obtain the requisite output power. Since the automatic gain control means is arranged to reduce the amplitude of the squared sinusoidal signal in accordance with the magnitude of the larger of the two outputs, under normal conditions the output of the output stage would control the amplitude of the squared signal. The gain control means may comprise means for superimposing both said control signals on a datum signal and rectifying the signals thus combined such that the minimum value of the combined signals is depressed from the value of said datum signal by an amount proportional to the amplitude of said larger signal, and said control means may be arranged to apply the combined signals to the amplitude limiting means such that the maximum amplitude of the squared signal is clamped to the minimum value of the combined signals. It will be apparent that the control signals obtained from the amplifying stages reduce the value of the datum signal from that which it would have in the absence of the control signals. The resultant signal, which might be termed "clamping" signal, is essentially the combination of two signals, a larger signal produced by the smaller of said two outputs and a smaller automatic gain control signal produced by the larger of the two outputs. These signals may in fact represent the difference between the maximum amplitude of the respective output signals from a further datum. The maximum limited amplitude of the squared signal may be arranged to vary in accordance with the resultant signal, which, as will be seen, is the same as being controlled by the larger of the two *control* signals representing the outputs from the intermediate and final stages.

The amplitude of the *control* signal from the final output stage is normally fairly large and under normal conditions, the amplitude of the square signal is small. Also, under normal conditions, the superimposition of the two control signals on the same datum renders the automatic gain control means only controllable by the larger of the two control signals. The advantage of this arrangement may be seen if a change in the load conditions is considered. With conventional automatic gain control systems, if the output signal is reduced, the input signal to a control stage rises to provide increased gain through the forward amplifying loop. If the final output signal were to fall to zero, due for example to a short circuit at said output stage, the increase in the input to the control stage might easily result in an overdrive condition in the squaring or intermediate stages. With the present invention, since the control signal from the final output stage would then be smaller than that provided by the intermediate stage, the clamping of the squared output would be controlled by the output of the intermediate stage. This is normally within a few percent of the normal voltage output of the final stage. The amplitude of the squared signal would rise, but not so far as to reach the aforementioned overdrive condition. Even with the fault condition of a short circuit on one of the output stages, the earlier stages of the transmitter would still function normally to produce the required output at the output of the *intermediate* stage.

The true significance of this may perhaps be more readily appreciated if the nature of the radio transmitting station is more fully described. Very preferably the station comprises a plurality of channels, conveniently each arranged to receive the same input signal and each having similar squaring, limiting and amplifying stages. However, the outputs of the intermediate stages are preferably connected in parallel and preferably there are provided a plurality of output stages which are fed in parallel by the intermediate stages and whose outputs are connected to a common output such as a single aerial. Now let certain fault conditions be considered. A frequent condition is a fault condition in one of the final output stages. These stages bear the brunt of the power amplification and component failure can be fairly frequent in them. With the present invention, the existence of an open circuit condition in a final amplifying stage does not cause any over-dissipative condition. All that happens is that the value of the control signal falls slightly and the maximum limited output of the square of stage is slightly increased. This increase provides the necessary increase in power so that the intermediate stages can drive the remaining output stages that still work properly, without any danger of an over-dissipative condition.

Another fault condition that might occur is the existence of a short circuit on the output stages of a channel. Under these conditions, there is still no danger of any overdrive condition in the early stages, which might otherwise tend to burn out components, because the amplitude of the squared signal is limited to a maximum by virtue of the squaring stages, which are unaffected by any load condition. Thus, the arrangement of the present invention provides a radio transmitter that provides stable operation under a variety of conditions. In the context of the redundant structure of typical radio transmitting stations used for phase comparison radio navigation systems, the invention is very useful since it can provide the necessary incerases in output power to take into account the otherwise loss of power caused by component failure, without any danger of overdrive conditions developing in the earlier amplifying stages.

Using a system in which a reversed biassed avalance or Zener diode or the like limits the output of the squaring means, said combined signals may be applied through a clamping circuit to said diode or the like, the datum value and the clamping circuit being arranged so that in the absence of said control signals said maximum amplitude would be controlled by said diode or like and that in the presence of said control signals said maximum amplitude is controlled by said combined signals.

Preferably, there is provided a low pass filter for filtering said squared signal to allow only the fundamental thereof to pass. Although the presence of the squared signal is necessary in order that the amplitude of the output signal can be carefully controlled, the actual signal which is radiated from a transmitting station is, for radio navigation purposes, often a pure sine wave. In certain well known types of radio navigation systems, such as that known as the Decca Navigator Ssytem, the frequencies that are radiated vary between $5f$ and $9f$ where $f$ is a frequency in the region of 14 kc./s. It will be apparent that the provision of a filter which has a pass band extending up to 130 kc./s. enables the same transmitter to be used for each of the radio transmitters in a system such as the Decca Navigator system. This arises because these stations normally radiate signals of $5f$, $6f$, $8f$ and $9f$, with periodic radiation of all these frequencies from the same station. If the same transmitter is to be used for all the stations, which abviously leads to a simplification of the equipment required, a pass band extending from $5f$ to $9f$ is appropriate. At the same time, the adoption of such a frequency band removes second harmonic components from the squared signal so that the output can, if desired, be a pure sinusoid at the fundamental frequency of the squared signal and hence the input sinusoid.

In the following description, reference will be made to the accompanying drawings, which illustrate one embodiment of the present invention and in which.

Figure 1:
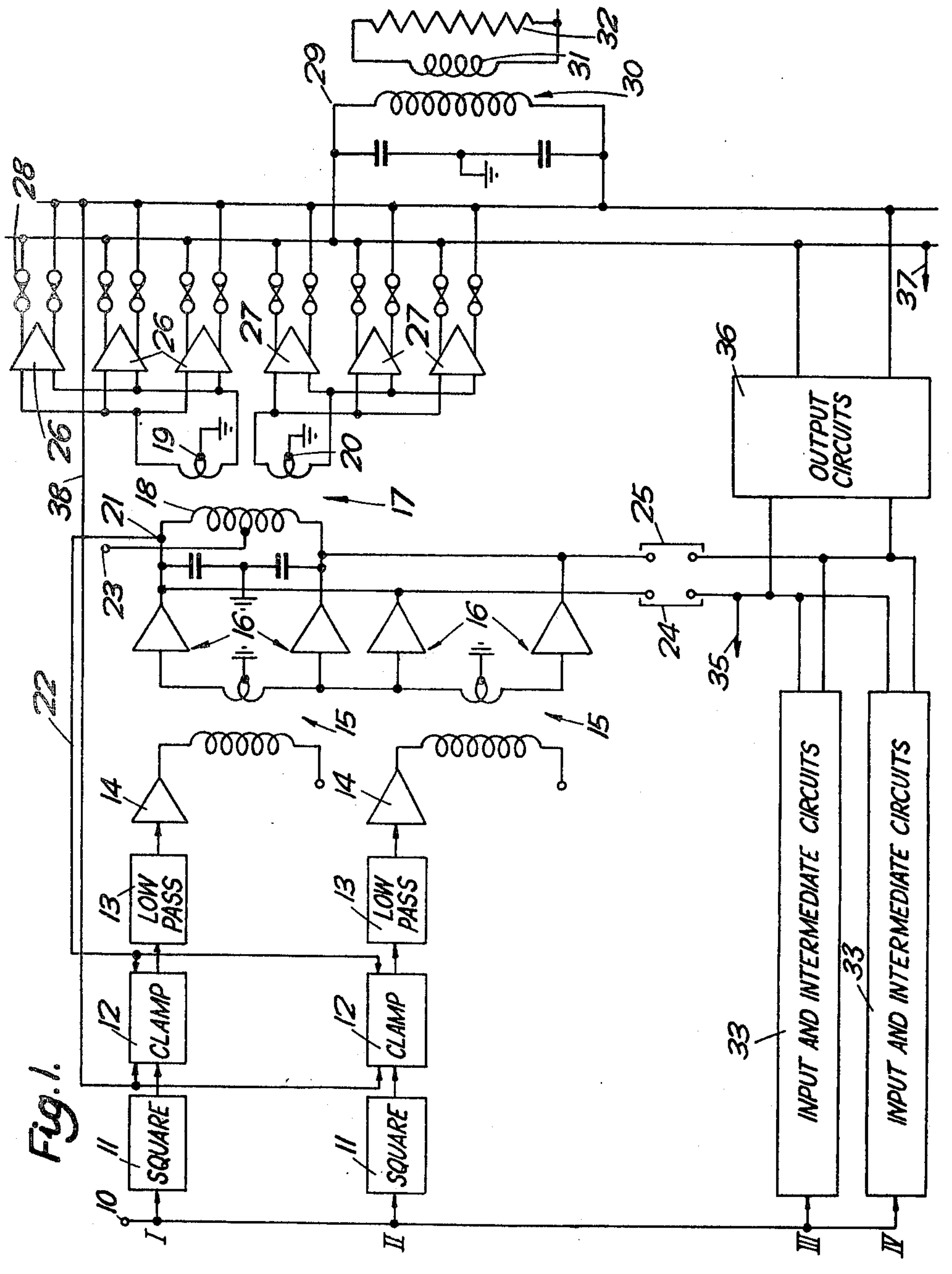
FIGURE 1 is a schematic ilustration of a radio transmitting station.

Referring firstly to FIGURE 1: a source 10 provides an input sinusoidal signal which is usually in the low radio frequency band. This signal is fed to four channels I, II, III, and IV. Each channel is to a certain extent identical, at least as far as the first few stages are concerned. Only channels I and II have been shown in detail; the structure of the channels III and IV will be mentioned later.

Figure 2:
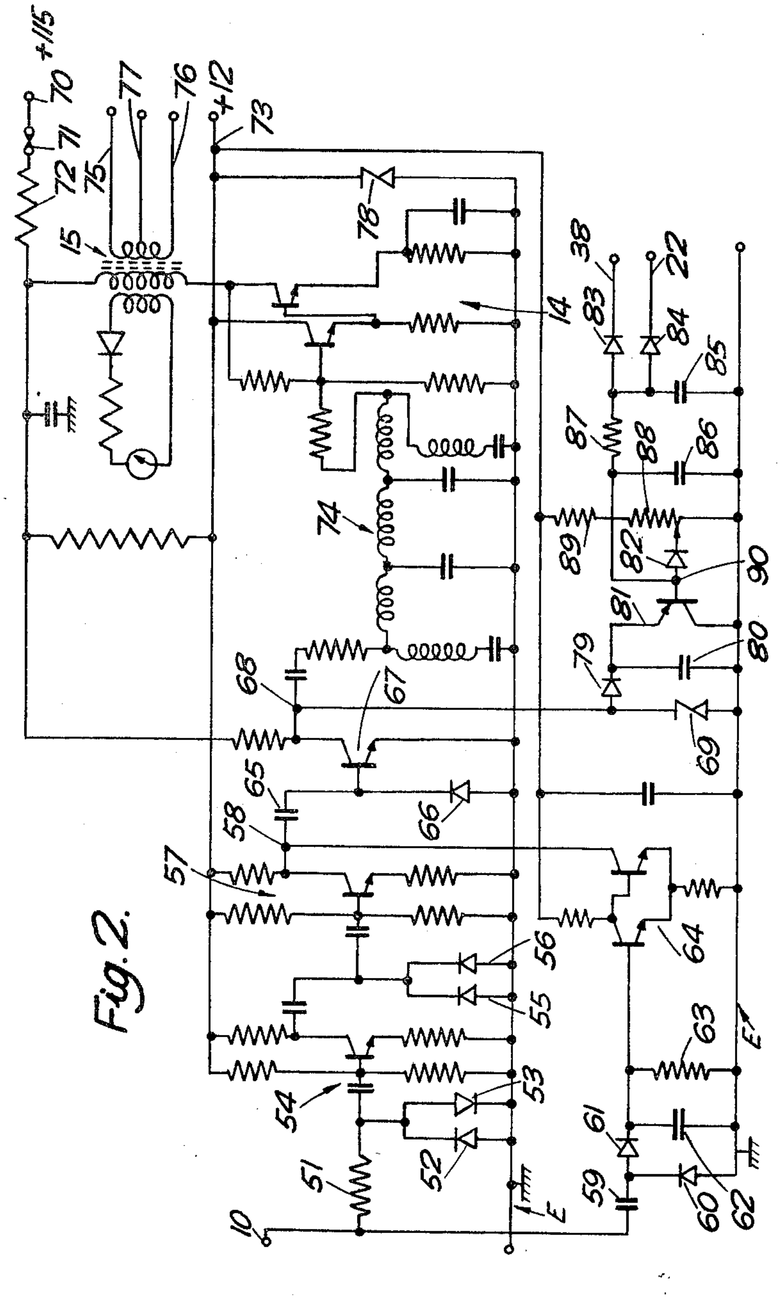
FIGURE 2 is a circuit diagram illustrating in more detail various parts of the station illustrated in FIGURE 1.

The input sinusoidal signal is fed to channels I and II and, in each channel, is squared by a squaring circuit 11 and from thence is fed to a clamp circuit 12 which limits the maximum amplitude of the squared signal to a fixed level. As will be more particularly described hereinafter, the amplitude of the squared signal may fall below this datum and will in practice normally be considerably below it. However, the clamp circuit is arranged to limit the maximum possible amplitude of the squared signal to a fixed limit. In the embodiment shown, the limited signal is fed through a low pass filter 13 and to a high gain amplifier 14. The low pass filter is preferably arranged so that third harmonic components of the squared signal are removed and this will leave the signal that is amplified by the amplifier 14 as the input sinusoidal signal, which is the fundamental of the squared signal. This conveniently renders the system suitable for continuous wave phase comparison navigation systems. Each amplifier 14 is "single-ended" and feeds the primary winding of transformer 15 whose secondary is centre tapped and whose ends each feed a separate half 16 of an intermediate amplifier. It will be noted that the secondary windings of the two channels I and II are coupled together and each feed a separate intermediate amplifier. The amplifiers are preferably grounded base transistor amplifiers with a large degree of negative feedback in order to render them stable under most operating conditions. Coupled across the outputs of the amplifiers 16 is the primary winding 18 of the transformer 17. The centre tap of winding 18 is coupled to the high tension supply 23 and a pair of capacitors is also coupled across the winding 18, the junction between the capacitors being grounded. It will be seen that this arrangement provides a signal on transformer winding 18 that is an AC signal superimposed on a DC level. The significance of this will be more readily appreciated when the apparatus in FIGURE 2 is described in detail.

At this point it may conveniently be stated that channel III includes input and intermediate circuits 33 that correspond to the same circuits in FIGURE 1 up to and including amplifiers corresponding to the amplifiers 16 and that channel IV comprises the same circuits. The outputs of the third and fourth channels are coupled through the links 24 and 25 to corresponding points in channels I and II, that is to say at each end of transformer winding 18. The links 24 and 25 may be broken if necessary to permit maintenance of either pair of channels. It is further to be noted that each half of the input and intermediate circuits, that is to say channels I and II taken together or channels III and IV taken together can provide all the necessary power at their respective transformer windings 18 required to achieve normal maximum radiated power from the transmitted aerial.

From one end of the transformer 18, at the point 21, and from a corresponding point in the third and fourth channels lead respectively the control lines 22 and 35 which, as will be seen, carry back to the clamp circuits 12 a signal which corresponds to the signal across the respective transformer winding 18. This signal is a large AC signal superimposed upon a datum DC signal. It is thus noted even at this stage that if a fault condition should exist at or about the transformer winding 18 of one half of the station, the other half still continues to function and may still continue to provide the required control signal back along the respective lines 22 or 35. Since as has been stated each half of the circuit as thus far described is providing all the necessary power for the output circuits, the transmitting station may still continue to function adequately even if half of it is inoperative or being maintained.

The transformer winding 18 feeds two secondary windings 19 each of which is centre tapped to ground and each of which feeds three identical output amplifiers 26, each of which conveniently comprises a pair of grounded base feedback amplifiers connected in push-pull. The output amplifiers are conveniently removable, to allow maintenance; each trio of amplifiers may form a removable "module." The outputs from each amplifier 26 are fed through fuses 28 to respective output lines which feed respective ends of the primary transformer winding 30 of the transformer 29. This transformer winding has capacitors coupled across it, the junction of these capacitors being connected to ground, and feeds a secondary winding 31. The secondary winding 31 feeds an aerial system, possibly through a co-axial feeder or any other suitable means. The feeder or aerial is represented by the resistance 32 which for many purposes is often a pure resistance of around 75 ohms (the equivalent resonant impedance of the aerial). From one line connected to one end of the transformer winding 30 are coupled control lines 38 and 37 which feed the clamping circuits for channels I and II and III and IV respectively with a signal representing the voltage output of the final output stages which are illustrated diagrammatically at 36 for channels III and IV.

Reference will now be made to FIGURE 2 in order to describe more particularly the operation of the invention. FIGURE 2 essentially shows in more detail a circuit embodying a single channel up to and including a transformer 15. It also includes certain additional details not shown in FIGURE 1. The input sinusoidal signal is applied from source 10 through the input resistor 51 and is clipped at both positive and negative levels by the clipping diodes 52 and 53 and fed to class A amplifier 54 from whence it is again clipped by diodes 55 and 56 and amplified in an amplifier 57. The normal output from the amplifier 57 is a squared signal which is coupled to a capacitor 65, again limited by diode 66 and amplified by a buffer stage 67. The output of the squaring and clamping stages is essentially between the point 68 and the grounded line E. In actual practice, the maximum amplitude of the output voltage at this point may be about 3.7 volts, i.e., about 7.5 volts peak to peak varying between earth and plus 7.5 volts. Supply for the stages 54 and 57 is obtained from a line 73 and supply for the stage 67 is obtained from the 115 volt, positive supply terminal 70 through a fuse 71 and a resistor 72. Additional resistance may be incorporated in the circuit, and the supply line 73 is fed from the 115 volt terminal through a voltage dropping resistor, the 12 volt voltage on line 73 being maintained by a reverse-biassed Zener diode 78.

Before the gain control circuit is described, it is convenient to describe what happens to the clamped signal after it reaches point 68. It is normally clamped to a maximum limited value of about 7.5 volts by a Zener diode 69. That is to say, the potential at point 68 cannot rise above 7.5 volts positive. The squared voltage signal at this point is fed through the low pass filter 74, which is the embodiment of the low pass filter 13 of FIGURE 1. The output of this filter is amplified by the high gain feedback amplifier 14 which feeds the transformer 15. The secondary of this transformer is tapped at 77, to ground, and the output lines on either end of the secondary, namely output line 75 and 76, are coupled to the channel's amplifying stages 16 in FIGURE 1. They will also be coupled to corresponding output lines in the other channels, as shown in FIGURE 1. Also fed from the primary of transformer 15 is a further secondary winding including a rectifier, limiting resistor and an ammeter which indicates the current level in the transformer 15. It thus provides some indication of whether the circuit is functioning properly.

It will be appreciated that it is undesirable to amplify noise signals in the absence of the wanted continuous wave signals. Squaring and limiting circuits are particularly prone to provide maximum output when fed by a very low value noise signal or the like. The circuit of FIGURE 2 includes a circuit when prevents the two input stages 54 and 57 from providing an output unless the input signal from the source 10 is more than the predetermined value. It will again be appreciated that the signal forming the noise signal may be of a different frequency to that of the required input sinusoid, which may have unfortunate results if the noise signal is radiated from the transmitting station. Where the transmitter is being used in a phase comparison navigation system it is important that the correct frequencies be radiated from the correct stations at the correct time. The input sinusoidal signal is therefore also fed through a conventional voltage doubling circuit comprising a capacitor 59 and the diodes 60, 61, capacitor 62 and a resistor 63. The doubled and rectified signal is fed to the Schmitt trigger 64. Normally, the input sinusoidal signal provides a rectified signal at the output of diode 61 sufficient to trigger the Schmitt trigger circuit so that the point 58 can rise to the level corresponding to the maximum of stage 57. If however the signal applied to the input capacitor 59 is below a level which corresponds to the threshold level of the Schmitt trigger 64, the point 58 is maintained at a very low voltage, thus preventing any significant output from stage 57 from being fed to the later amplifying stages.

Figure 3:
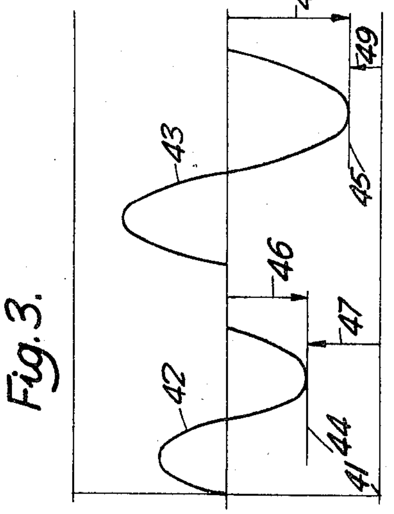

The automatic gain control circuit will now be more particularly described. FIGURE 3 illustrates the control signal that appear on lines 22 and 35. The signal 43 is the output from a final amplifying stage 26 and is superimposed on a datum DC level which is normally about 120 volts. Likewise, the signal 42 is the AC output of an intermediate stage superimposed on the same level. These voltages appear respectively on lines 38 and 22. In the absence of these signals, the point 68 in FIGURE 2 is maintained at the value determined by the Zener diode 69. The point 68 is also coupled through a clamping diode 79 and a transistor 81 to the transistor's base 90. In the absence of any control signals on lines 22 and 38 the base 90 is at approximately 6.5 volts so that the emitter of transistor 81 is at 7 volts whereby the point 68 is also clamped to a voltage almost identical to that determined by the Zener diode 69. In actual practice the clamping voltage is slightly higher than that provided by Zener diode 69 so that if no signals on lines 22 and 38 were present, the Zener diode would perform the clamping operation. The control signals are fed through respective rectifying diodes 83 and 84, which are shunted by a smoothing capacitor 85, and are further smoothed by a resistor 87 and a shunt capacitor 86. The level of the rectified voltage from the intermediate stage is shown on FIGURE 3 as the level 44 so that the amplitude of the rectified signal at point 90 is shown by the value 47 which as will be seen from FIGURE 3 is depressed from the datum signal value by the amount 46 which corresponds to the maximum amplitude of the intermediate output 42. In like manner, the voltage at point 90 due to the control signal on line 38 is the value 49 which differs from the datum value by the amount 48, the amplitude of the AC output from the final stage. Combining these signals in the manner described produces a resultant voltage 49 at the point 90. It will be seen therefore that the point 68 will be clamped to the new voltage appearing at point 90 and will be depressed from the value of 7.5 volts or thereabouts by the amount corresponding to the larger of the two signals 42 and 43 that is to say under normal conditions by the amount represented by the value 48. The input to the filter 74 is thus reduced to the value 49. This clamping of the squared signal to value 49 provides automatic gain control, since a *slight* increase in the amplitude 48 of signal 43 will cause a *slight* reduction in the value 49 and the amplitude of the limited squared signal at point 68. Similarly a *slight* reduction in the amplitude 48 causes a *slight* increase in the amplitude at point 68.

Figure 4:
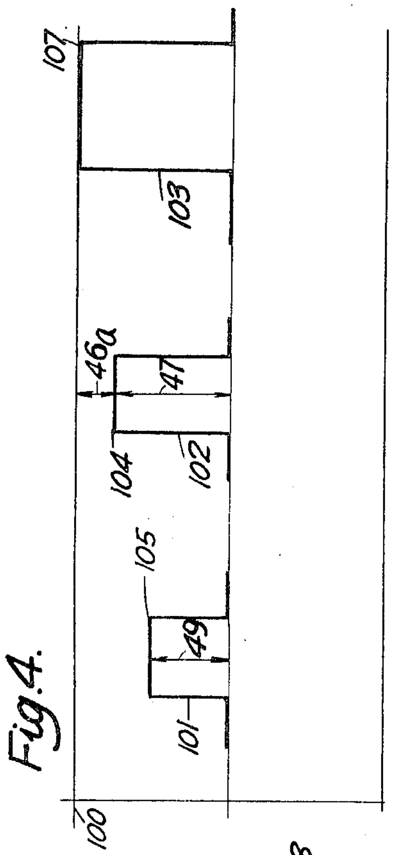
FIGURES 3 and 4 are waveform diagrams illustrating various signals that can be present at various points in the circuit of FIGURE 2.

This condition is shown more particularly in FIGURE 4. Under conditions of no AGC the signal at point 68 is shown at 103 which has a maximum value 107, determined by the Zener diode 69. Under normal operating conditions however the signal 103 is reduced to the signal 101 having a maximum amplitude 105. This has been depressed from the value 107 to approximately the value 49. However, if the *amplitude* of the AC signal 43 were to fall below that of the AC signal 42, the signal 103 would become that shown at 102, which has a maximum value 104 depressed from the value 107 to approximately the value 47 as along as this is below the voltage at which the Zener diode 69 clamps.

There has been described a radio transmitter incorporating automatic gain control means that provides satisfactory transmitter operation under a variety of conditions. It will be apparent to those skilled in the art that the transmitter described can work satisfactorily under a variety of fault conditions, which need not all be described.

I claim:

1. A radio transmitter comprising:
an RF sinusoidal signal source producing an RF sinusoidal signal; squaring means coupled to receive said RF signal and arranged to produce therefrom a squared signal;
clamping means;
means coupling said squared signal to said clamping means;
said clamping means clamping the amplitude of said squared signal to a predetermined value;
an intermediate amplifying stage coupled to said clamping means;
a final amplifying stage having an input coupled to said intermediate amplifying stage and an output;
aerial means coupled to the output of said final amplifying stage; and
automatic gain control means controlling said clamping means to reduce said amplitude of said squared signal in accordance with an increase in the amplitude of a first control signal, said automatic gain control means comprising:
control means coupled to the output of said intermediate stage to produce a second control signal representative of the signal level at the output of the intermediate stage and coupled also to the output of said final amplifying stage to produce a third control signal representative of the signal level at the output of said final amplifying stage and combining means combining said second and third control signals to produce said first control signal.

2. A radio transmitter as claimed in claim 1 wherein said combining means comprise means for superimposing both said second and third control signals on a datum signal and rectifying the signals thus combined such that the minimum value of the combined signals is depressed from the value of said datum signal by an amount proportional to the amplitude of said larger signal, and wherein said combining means applies said combined signals to the clamping means such that the maximum amplitude of said squared signal is clamped to the minimum value of said combined signals.

3. A radio transmitter as claimed in claim 2 wherein the clamping means includes a reversed biassed Zener diode coupled across the output of the squaring means.

4. A radio transmitter as claimed in claim 1 and including a low pass filter for filtering said squared signal to allow only the fundamental thereof to pass said low pass filter being coupled between said clamping means and said intermediate amplifying stage.

5. A radio transmitter as claimed in claim 5 wherein said low pass filter is arranged to pass frequencies of up to and including $9f$ kc./s. where $f$ is substantially 14 kc./s.

6. In a radio transmitter having an RF sinusoidal signal source producing an RF sinusoidal signal, and having aerial means, a plurality of amplifying channels, each channel comprising:
squaring means coupled to receive said RF signal and arranged to produce a squared signal;
clamping means;
means coupling said squared signal to said clamping means;
said clamping means clamping the amplitude of said squared signal to a predetermined value;
an intermediate amplifying stage coupled to said clamping means;
a final amplifying stage coupled to said intermediate amplifying stage; and
automatic gain control means controlling said clamping means to reduce said amplitude of said squared signal in accordance with an increase in the amplitude of a first control signal, said automatic gain control means comprising:
control means coupled to the output of said intermediate stage to produce a second control signal representative of the signal level at the output of the intermediate stage and coupled also to the output of said final amplifying stage to produce a third control signal representative of the signal level at the output of said final amplifying stage and combining means combining said second and third control signals to produce said first control signal.

7. The structure defined in claim 6 and further comprising first means coupling the outputs of all said final amplifying stages together.

8. The structure defined in claim 7 and further comprising second means coupling the outputs of said intermediate stages together.

9. The structure defined in claim 8 wherein said combining means comprise means for superimposing both said second and third control signals on a datum signal and rectifying the signals thus combined such that the minimum value of the combined signals is depressed from the value of said datum signal by an amount proportional to the amplitude of said larger signal, and wherein said combining means applies said combined signals to the clamping means such that the maximum amplitude of said squared signal is clamped to the minimum value of said combined signals.

10. In a radio transmitter having an RF sinusoidal signal source producing an RF sinusoidal signal, and having aerial means, a plurality of amplifying channels, each channel comprising:

squaring means coupled to receive said RF signal and arranged to produce a squared signal;
clamping means;
means coupling said squared signal to said clamping means, said clamping means clamping the amplitude of said squared signal to a predetermined value;
a low pass filter coupled to said clamping means to receive the squared signal therefrom, said low pass filter having a bandwidth preventing the passage of third harmonic components of said squared signal;
an intermediate amplifying stage coupled to said low pass filter;
a final amplifying stage coupled to said intermediate amplifying stage and to said aerial means; and
automatic gain control means controlling said clamping means to reduce said amplitude of said squared signal in accordance with an increase in the amplitude of a first control signal, and automatic gain control means comprising:
control means coupled to the output of said intermediate stage to produce a second control signal representative of the signal level at the output of the intermediate stage and coupled also to the output of said final amplifying stage to produce a third control signal representative of the signal level at the output of said final amplifying stage and combining means combining said second and third control signals to produce said first control signal.

11. The structure set forth in claim 10 in which the said final amplifying stage for each channel comprises a grounded-base, push pull, transistor amplifier.

References Cited

UNITED STATES PATENTS

| | | | |
|---|---|---|---|
| 2,172,453 | 9/1939 | Rose | 325—159 XR |
| 2,861,123 | 11/1958 | Cooper | 343—208 XR |
| 3,366,883 | 1/1968 | Griffin et al. | 325—150 XR |

RICHARD MURRAY, Primary Examiner

C. R. VONHELLENS, Assistant Examiner

U.S. Cl. X.R.

325—62, 159